(12) United States Patent
Kim

(10) Patent No.: US 7,850,337 B2
(45) Date of Patent: Dec. 14, 2010

(54) LCD DEVICE AND METHOD OF DRIVING THE LCD DEVICE

(75) Inventor: Ki Duk Kim, Gunpo-shi (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 10/951,718

(22) Filed: Sep. 29, 2004

(65) Prior Publication Data

US 2005/0141217 A1 Jun. 30, 2005

(30) Foreign Application Priority Data

Dec. 30, 2003 (KR) .................. 10-2003-0100828

(51) Int. Cl.
*F21V 33/00* (2006.01)

(52) U.S. Cl. .................. 362/234; 362/612; 362/231

(58) Field of Classification Search .......... 362/234, 362/632, 240–241, 126–134, 612, 231, 153
See application file for complete search history.

(56) References Cited

U.S. PATENT DOCUMENTS

| | | | | |
|---|---|---|---|---|
| 4,652,913 A | * | 3/1987 | Saitoh et al. ........... | 358/509 |
| 5,143,433 A | * | 9/1992 | Farrell .................. | 362/29 |
| 5,748,828 A | * | 5/1998 | Steiner et al. .......... | 385/146 |
| 5,760,858 A | * | 6/1998 | Hodson et al. ......... | 349/61 |
| 6,241,363 B1 | * | 6/2001 | Lee ....................... | 362/231 |
| 6,295,106 B1 | * | 9/2001 | Fukuzawa et al. ...... | 349/71 |
| 6,369,867 B1 | * | 4/2002 | Ge ........................ | 349/73 |
| 6,666,567 B1 | * | 12/2003 | Feldman et al. ........ | 362/237 |
| 6,672,733 B2 | * | 1/2004 | Nagatani ............... | 362/614 |
| 6,700,633 B2 | * | 3/2004 | Cho ...................... | 349/65 |
| 6,795,751 B2 | * | 9/2004 | Cull et al. .............. | 700/265 |
| 6,840,646 B2 | * | 1/2005 | Cornelissen et al. .... | 362/606 |
| 6,965,367 B2 | * | 11/2005 | Tanaka et al. .......... | 345/102 |
| 7,030,848 B2 | * | 4/2006 | Sato et al. .............. | 345/95 |
| 2002/0167016 A1 | * | 11/2002 | Hoelen et al. .......... | 257/89 |
| 2004/0085747 A1 | * | 5/2004 | Yamamoto ............. | 362/31 |
| 2005/0231944 A1 | * | 10/2005 | Doll et al. .............. | 362/231 |
| 2006/0002143 A1 | * | 1/2006 | Gu et al. ................ | 362/612 |
| 2006/0023447 A1 | * | 2/2006 | Justel et al. ............ | 362/231 |

FOREIGN PATENT DOCUMENTS

| | | | | |
|---|---|---|---|---|
| EP | 1270331 | * | 6/2002 | |
| JP | 362272449 A | * | 11/1987 | ......... 313/112 |
| JP | 2003-140110 A | | 5/2003 | |
| KR | 2003-0058065 A | | 7/2003 | |
| KR | 2003-0086399 A | | 11/2003 | |

* cited by examiner

*Primary Examiner*—Jong-Suk (James) Lee
*Assistant Examiner*—Julie A Shallenberger
(74) *Attorney, Agent, or Firm*—Birch, Stewart, Kolasch & Birch, LLP

(57) ABSTRACT

A backlight unit enables an LCD to realize five primary colors using a four sub-pixel structure. The backlight unit includes at least one fluorescent lamp of white color, at least one light source of yellow color, and at least one light source of cyan color. Alternatively, the backlight unit includes at least one first fluorescent lamp of white color having R, G, and B wavelengths, and second or/and third fluorescent lamps provided in between the adjacent first fluorescent lamps. The second fluorescent lamp is coated with yellow pigment, and the third fluorescent lamp is coated with cyan pigment.

11 Claims, 7 Drawing Sheets

LCD DEVICE AND METHOD OF DRIVING THE LCD DEVICE

This application claims the benefit of the Korean Application No. P2003-100828 filed on Dec. 30, 2003, which is hereby incorporated by reference.

BACKGROUND OF THE INVENTION

1. Field of the Invention

The present invention relates to a backlight unit. More particularly, the present invention relates to a backlight unit which permits an LCD device to realize five primary colors using only a four sub-pixel structure, an LCD device having the backlight unit, and a method of driving the LCD device.

2. Discussion of the Related Art

A Cathode Ray Tube (CRT) has been widely used for computer monitors and televisions. However, the CRT is heavy and bulky. Thus, display devices, such as a liquid crystal display (LCD), a plasma display panel (PDP) and an Electroluminescence display (ELD), have been substituted for the CRT. Among the alternative display devices, the LCD device has been very popular due to the LCD device having a low power consumption, thin profile and lightness in weight. The LCD device has been employed as a monitor for a desktop computer, a large sized television display device, as well as for a laptop computer.

The LCD device includes an LCD panel for displaying a picture image, and a driving part for applying a driving signal to the LCD panel. The LCD panel has first and second glass substrates bonded to each other with a predetermined interval therebetween, and a liquid crystal layer injected between the first and second glass substrates.

On the first glass substrate (TFT array substrate), there are a plurality of gate lines arranged in a first direction at fixed intervals, a plurality of data lines arranged in a second direction perpendicular to the gate lines at fixed intervals, a plurality of pixel electrodes in respective pixel regions defined by the gate lines and the data lines in a matrix, and a plurality of thin film transistors (TFTs), switchable in response to signals on the gate lines, for transmission of signals on the data lines to the pixel electrodes.

The second glass substrate (color filter substrate) has a black matrix layer for shielding light from areas excluding the pixel regions, a color filter layer (R, G, B) for displaying colors, and a common electrode for implementing a picture image.

The foregoing first and second glass substrates have a predetermined gap therebetween which is maintained by spacers, and the first and second glass substrates are bonded by a sealant having a liquid crystal injection inlet. Liquid crystal is injected through the liquid crystal injection inlet. The LCD device controls transmittance of ambient light to display the picture image. In this respect, the LCD device requires an additional light source, such as a backlight. The backlight is classified into a direct type backlight and an edge type backlight, according to a position of lamps.

In the edge type backlight unit, a lamp unit is provided at one side of a light-guiding plate. The lamp unit is provided with a lamp emitting light, a lamp holder holding both ends of the lamp to protect the lamp, and a reflective plate having one side facing the light-guiding plate and partially surrounding the circumference of the lamp, to reflect the light emitted from the lamp to the light guiding plate. The edge type backlight unit is generally applied to relatively small sized LCD devices, such as the monitor of a laptop computer or a desktop computer. The edge type backlight is advantageous in that it has great uniformity of light, long life span, and a thin profile.

The direct type backlight unit is suitable for a large sized LCD device of 20 inches or more. In the direct type backlight unit, a plurality of lamps are arranged in one direction below a light-diffusion plate to directly illuminate an entire surface of the LCD panel with light. The direct type backlight unit has great light efficiency and is commonly used for the large sized LCD device requiring high luminance. A large-sized monitor or television of the LCD type would use the direct type backlight unit. After the lamps are driven for a long time, there is a tendency for the lamps to malfunction or simply burn out at the end of the lamp's life. In the direct type LCD device, a plurality of lamps are formed underneath a screen. Accordingly, if one of the lamps turns off due to malfunction or the end of the lamp's life, a screen portion corresponding to the turned-off lamp becomes darker, as compared to surrounding portions of the screen. In this respect, the direct-type LCD device has to have a simple structure suitable for disassembly and reassembly of the lamp unit.

LCD devices can use light sources such as Electro Luminescence (EL), a Light Emitting Diode (LED), a Cold Cathode Fluorescent Lamp (CCFL) or a Hot Cathode Fluorescent Lamp (HCFL). The CCFL has a long lifetime, low power consumption and a thin profile is commonly used as the light source for a large sized color TFT LCD device.

In case of the CCFL, a fluorescent discharge tube is used for using a penning effect, which is formed by injecting a hydrargyrum gas containing Argon (Ar) and Neon (Ne) at a low temperature. Electrodes are formed at both ends of the fluorescent discharge tube, and the cathode is formed in a plate-shape. When a voltage is applied thereto, electric charges inside the fluorescent discharge tube collide against the plate-shaped cathode, thereby generating secondary electrons. Circumferential elements are excited by the secondary electrons, whereby plasma is generated. The circumferential elements emit strong ultraviolet rays, and then the ultraviolet rays excite a fluorescent substance, thereby emitting visible rays.

The aforementioned LCD device controls the light transmittance on the screen with the liquid crystal, thereby determining colors and brightness on the screen of the LCD device. Thus, the LCD device has the following characteristics: varying a viewing angle varies a picture quality according to an angle of a viewer's eye to the screen, a light transmittance according to a transmissive light-emitting display, a color realization ratio by realizing red(R), green(G) and blue(B) colors by transmitting the light through a color filter layer, a luminance for the brightness of the picture image, and a residual image remaining on the screen after one picture image is displayed on the screen for a long time.

Currently, LCD device has some disadvantages to the color realization ratio and the luminance ability as compared to a CRT. The related art LCD device of a notebook computer has a color realization ratio of 40% to 50% as compared with an NTSC method adopted for color television broadcasting by the National Television System Committee. For a computer monitor, this is enough to satisfy the viewers. However, in the case of television, this color realization needs improvement. It would be desirable to develop an LCD device having a greater color realization ratio than that of the CRT.

A general multi-color LCD device includes an LCD panel, a backlight and a color filter. The general multi-color LCD device uses the backlight of a fluorescent lamp having three wavelengths as a light source. A white light emitted from the backlight is divided into three colors (red, green and blue) in the color filter, and the divided colors are mixed again to display various colors.

The color of the light source is determined according to chromaticity coordinates of the Commission International De L'eclairage (C.I.E.). That is, tristimulus values 'X', 'Y' and 'Z' are calculated from a spectrum of a predetermined light source, and then x, y and z chromaticity coordinates of red, green and blue are calculated according to a conversion matrix. Subsequently, x and y values of the red, green and blue are expressed as rectangular coordinates, so that a U-shaped spectral locus is drawn, which is called as CIE chromaticity diagram. The general light source has the chromaticity coordinates inside the U-shaped spectral locus. A triangle space of the red, green and blue chromaticity coordinates becomes a color realization space. As the triangle space becomes large; the color realization ratio becomes greater. The color realization depends on color purity and luminance. As the color purity and the luminance become greater, the color realization increases. Herein, the tristimulus values 'X', 'Y' and 'Z' indicate a weight of a color-matching function approaching to one spectrum. Especially, 'Y' is a stimulus value to the brightness.

A color temperature means a temperature of the hue of the white color according to the color change of the light emitted by a temperature of a heat source. On a monitor, the color temperatures appear as 9300K, 6500K and 5000K. As the color temperature becomes close to 9000K, the hue of the white color contains a blue color. When the color temperature is 6500K, the hue of the white color contains a red color. When the color temperature is 5000K, a neutral hue is generated. The color temperature is obtained from the chromaticity coordinates (x, y) of the white color. As the color temperature becomes close to 9000K, it satisfies European broadcasting union (EBU) standards.

In case of the aforementioned LCD device, a luminous spectrum of the backlight is coupled with the color-matching function and a transmission spectrum of the color filter to determine the tristimulus values at each wavelength of the visible ray region. That is, in order to obtain the various colors, it is required to control a correlation between the backlight/color filter and the tristimulus values. In other words, the luminous spectrum of the backlight has to be controlled to optimize the color realization and the color temperature, and the transmission spectrum of the color filter has to be controlled to optimize luminosity.

To overcome the limit of recent color realization ratios of the LCD device having three primary colors (R, G, B), it has been proposed to develop an LCD device realizing four or five primary colors including yellow and/or cyan color as well as R, G, and B colors.

Hereinafter, a backlight unit of an LCD device according to the related art will be described with reference to the accompanying drawings.

FIG. 1 is a perspective view of a direct type backlight unit of an LCD device according to the related art. As shown in FIG. 1, the backlight unit according to the related art includes a plurality of fluorescent lamps 1, an outer case 3, and light-scattering means 5a, 5b and 5c. The outer case 3 fixes and supports the plurality of fluorescent lamps 1, and the light-scattering means 5a, 5b and 5c are provided between the fluorescent lamps 1 and an LCD panel (not shown). The light-scattering means 5a, 5b and 5c prevent the silhouette of the fluorescent lamps 1 from being visible on a display surface of the LCD panel (not shown), and provide a light source with uniform luminance. For improving the light-scattering effect, the light-scattering means includes a diffusion plate 5a, a prism sheet 5b, and a protection sheet 5c. Also, a reflective sheet 7 is provided inside the outer case 3 for concentrating the light emitted from the fluorescent lamps 1 to the display part of the LCD panel.

Each fluorescent lamp 1 is a Cold Cathode Fluorescent Lamp (CCFL). Electrodes are provided at both ends of each CCFL, whereby the CCFL emits light when power is provided to the electrodes. Both ends of the fluorescent lamp 1 are fixed to both sides of the outer case 3. Furthermore, power supplying wires 9 and 9a are respectively connected to the electrodes provided at both ends of the fluorescent lamp 1 to transmit power to the fluorescent lamp 1. The power supplying wires 9 and 9a are connected to a driving circuit by additional connectors.

A method of driving an LCD device with five primary colors will be described in brief. FIG. 2 is an array plane view of a color filter layer in an LCD device using five primary colors according to the related art. FIG. 3 is a plane view of a direct type backlight unit applied to an LCD device using five primary colors according to the related art.

To drive an LCD device with five primary colors with a direct type backlight unit, as shown in FIG. 2, a color filter layer is provided to have a unit pixel including five sub-pixels of red (R), green (G), blue (B), yellow (Y) and cyan (C). That is, the color filter layer is formed to have five primary colors. As shown in FIG. 3, the direct type backlight unit is provided to illuminate the LCD device with the five primary colors. The lamps 31 used for the backlight unit are Cold Cathode Fluorescent Lamps (CCFL), wherein the CCFL is made using a method to form the color peak with pigment.

In order to have the LCD device with five primary colors, it is necessary to provide the pigment of a desired color (for example, yellow or cyan) to the lamp of the backlight unit. However, it is difficult to control the composition ratio with R, G, and B pigments.

In addition, a CCFL of the five primary colors is not common in the art. Therefore such a CCFL would be costly to fabricate and employ.

As seen in FIG. 2, one pixel is provided with five sub-pixels. This lowers the aperture ratio and luminance.

SUMMARY OF THE INVENTION

Accordingly, the present invention is directed to a backlight unit, an LCD device having the backlight unit, and a method of driving the LCD device that substantially obviates one or more problems due to limitations and disadvantages of the related art.

An object of the present invention is to provide to a backlight unit which realizes five primary colors in a four sub-pixel structure, an LCD device having the backlight unit, and a method of driving the LCD device.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the present invention, as embodied and broadly described herein, a backlight unit includes a plurality of fluorescent lamps provided at fixed intervals; and first and second light sources alternately provided between the fluorescent lamps along one direction.

The fluorescent lamps and the first and second light sources may be disposed under an LCD panel to form a direct type backlight unit.

The fluorescent lamps may be formed of lamps having a white color having R, G, and B wavelengths, and the first and second light sources may be formed of LEDs of yellow and cyan colors, respectively.

In another aspect of the present invention, a backlight unit includes a plurality of fluorescent lamps provided in a direct type backlight arrangement at fixed intervals; and a plurality of first pairs of first and second light sources at one side of the LCD panel and a plurality of second pairs of first and second light sources at the other side of the LCD panel, provided at both ends of the fluorescent lamps, with each pair being disposed between the adjacent fluorescent lamps.

The backlight unit may include a light-guiding plate having concave and convex portions, provided between the first pairs and the second pairs at the both ends of the fluorescent lamps.

Also, the fluorescent lamps may be placed in concave-shaped portions of the light-guiding plate.

In another aspect, a backlight unit includes a rectangular light-guiding plate; first and second fluorescent lamps provided facing first and second sides of the light-guiding plate; and a plurality of first and second light sources alternately provided along facing third and fourth sides of the light-guiding plate.

In another aspect, a backlight unit includes a plurality of groups of first, second and third fluorescent lamps, provided by turns in a direct type backlight arrangement at fixed intervals, wherein the first fluorescent lamps are fluorescent lamps of white color, having R, G and B wavelengths, the second fluorescent lamps are lamps coated with yellow pigment, and the third fluorescent lamps are lamps coated with cyan pigment.

In another aspect, a backlight unit includes a plurality of first fluorescent lamps provided in a direct type backlight arrangement at fixed intervals; and a plurality of second and third fluorescent lamps alternately provided between adjacent first fluorescent lamps, wherein the first fluorescent lamps are fluorescent lamps of white color, having R, G, and B wavelengths, the second fluorescent lamps are lamps coated with yellow pigment, and the third fluorescent lamps are lamps coated with cyan pigment.

In another aspect, a liquid crystal display (LCD) device includes a backlight unit having at least one fluorescent lamp of white color, at least one light source of yellow color, and at least one light source of cyan color; and an LCD panel provided on the backlight unit.

The LCD panel is formed of unit pixels, each unit pixel including four sub-pixels (R, G, B, W).

In another aspect, a method of driving an LCD device, including a backlight unit having at least one fluorescent lamp of white color, at least one light source of yellow color, and at least one light source of cyan color, and an LCD panel formed of unit pixels, each unit pixel having four sub-pixels (R, G, B, W), includes a first step of turning on the fluorescent lamps of white color, and turning on the first, second and third sub-pixels (R, G, B), to realize red (R), green (G) or blue (B) color; a second step of turning on the first, second and fourth sub-pixels (R, G, W), and turning on the fluorescent lamps of white color and a light source of yellow color, to realize a yellow (Y) color; and a third step of turning on the second, third and fourth sub-pixels (G, B, W), and turning on the fluorescent lamps of white color and a light source of cyan color, to realize a cyan (C) color.

At this time, the light source of yellow or cyan is turned on in state of a time division.

Another aspect of the present invention involves a method of driving an LCD device, where the LCD device includes a backlight unit having at least one first fluorescent lamp of white color having R, G, and B wavelengths, and second or/and third fluorescent lamps provided in between the adjacent first fluorescent lamps, the second fluorescent lamps being coated with yellow pigment, the third fluorescent lamps being coated with cyan pigment, and an LCD panel formed of unit pixels, with each unit pixel having four sub-pixels (R, G, B, W). The method includes driving the first, second and third fluorescent lamps in sequence by synchronizing the driving of the backlight unit with the response of the liquid crystal according to video signals.

To realize a yellow (Y) color, the first, second and third fluorescent lamps are driven in sequence. The first and second sub-pixels (R, G) are turned on when the first fluorescent lamps are turned on, the fourth sub-pixel (W) is turned on when the second fluorescent lamps are turned on, and the fourth sub-pixel (W) is turned off when the third fluorescent lamp is turned on.

To realize a cyan (C) color, the first, second and third fluorescent lamps are driven in sequence. The second and third sub-pixels (R, G) are turned on when the first fluorescent lamps are turned on, the fourth sub-pixel (W) is turned off when the second fluorescent lamps are turned on, and the fourth sub-pixel (W) is turned on when the third fluorescent lamps are turned on.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, a backlight unit, an LCD device having the backlight unit, and a method of driving the LCD device will be described with reference to the accompanying drawings.

Figure 1:
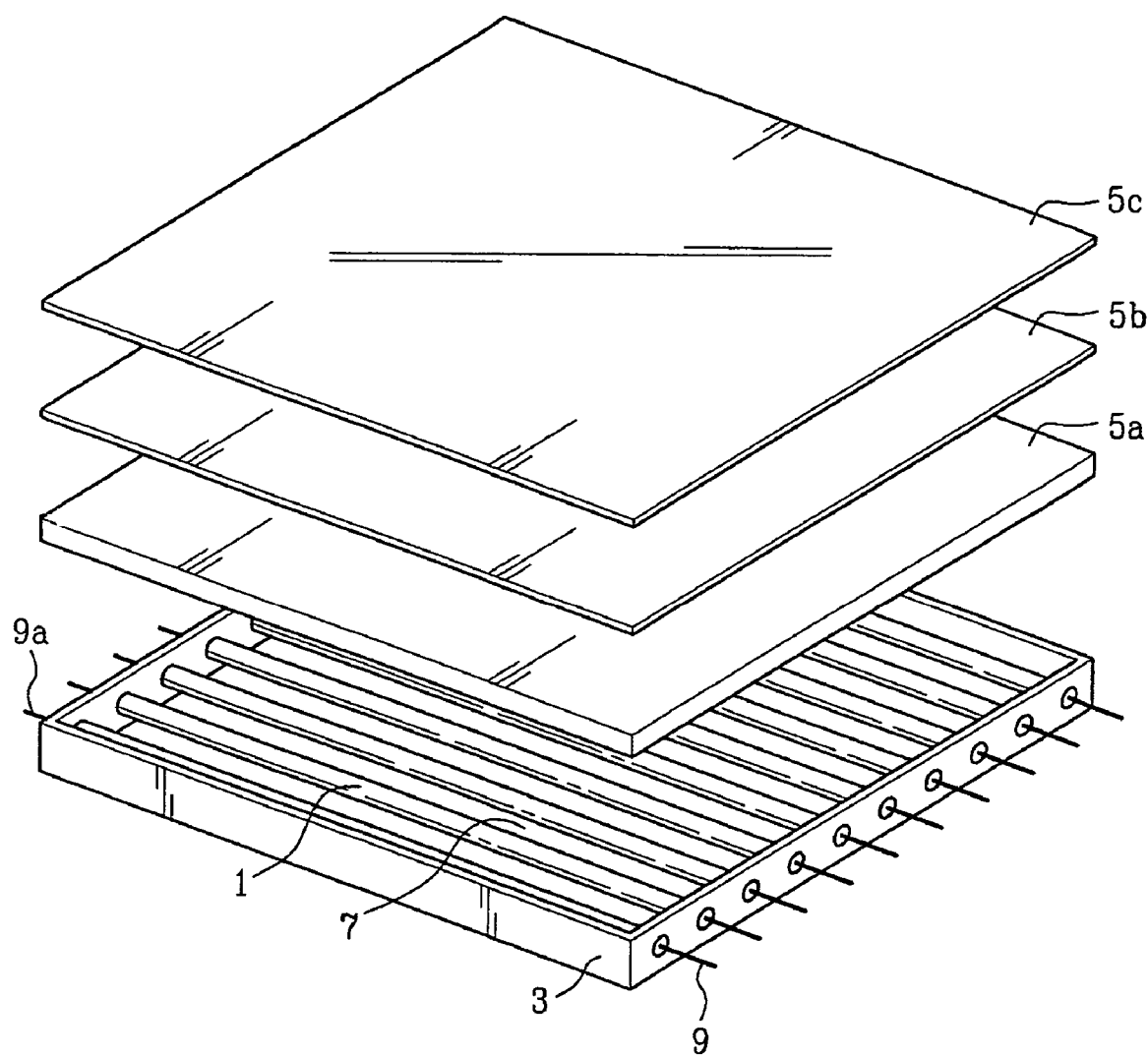
FIG. 1 is a perspective view of a direct type backlight unit, according to the related art.
Figure 2:
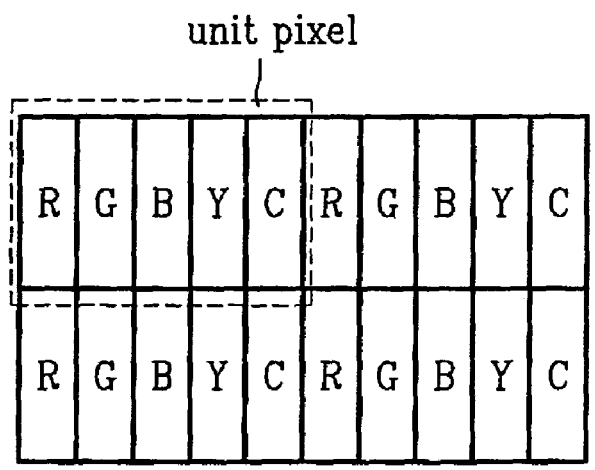
FIG. 2 is an array plane view of a color filter layer in an LCD device using five primary colors, according to the related art.
Figure 3:
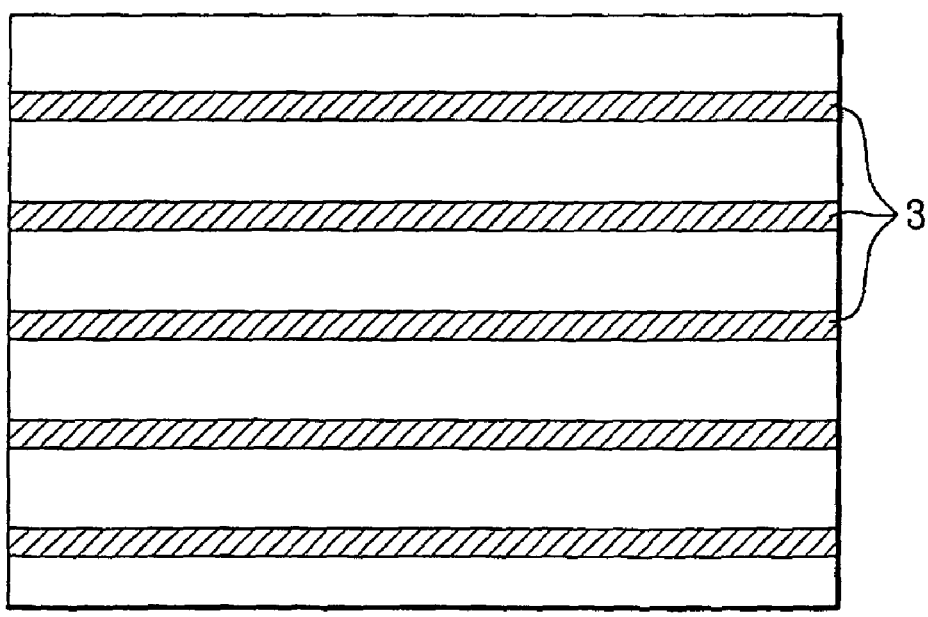
FIG. 3 is a plane view of a direct type backlight unit applied to an LCD device using five primary colors, according to the related art.
Figures 4, 5:
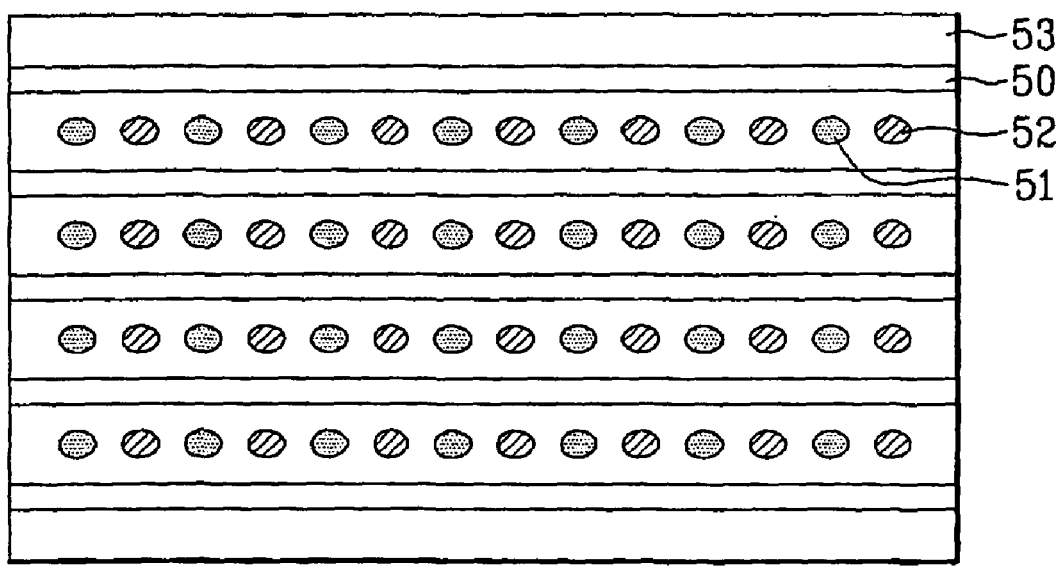
FIG. 4 is a plane view of a color filter layer in an LCD device, according to the present invention.
FIG. 5 is a plane view of a backlight unit, according to a first embodiment of the present invention.

FIG. 4 is a plane view of a color filter layer, in accordance with the present invention. First, as shown in FIG. 4, an LCD device, according to the present invention, includes a plurality of pixels, each pixel comprising four sub-pixels (R, G, B, W), wherein each color filter layer 40 of red (R), green (G), blue (B), and white (W) is formed in the sub pixel. The positions of the colors may be varied. For example, the positions of white (W) and blue (B) of the color filter layer 40 may be changed.

First Embodiment

A backlight unit according to the first embodiment of the present invention will be described as follows.

FIG. 5 is a plane view of a backlight unit, according to the first embodiment of the present invention. As shown in FIG. 5, the backlight unit, according to the first embodiment of the present invention, includes a plurality of fluorescent lamps 50 and a plurality of first and second point light sources 51 and 52 fixed to a case. The lamps 50 and light sources 51 and 52 are under an LCD panel and would constitute a direct type backlight. The plurality of fluorescent lamps 50 are disposed at fixed intervals within the case. The plurality of first and second point light sources 51 and 52 are disposed between the fluorescent lamps 50 and extend in a direction paralleling the fluorescent lamps 50 and alternate with each other.

Each fluorescent lamp 50 may be a CCFL (Cold Cathode Fluorescent Lamp) of white light having R, G and B wavelengths, a HCFL (Hot Cathode Fluorescent Lamp), or an EEFL (External Electrode Fluorescent Lamp). The first and second point light sources 51 and 52 may be LEDs of yellow and cyan colors.

Although not shown, a light-scattering means including a diffusion plate and a prism sheet is provided over the fluorescent lamps 50 and the first and second point light sources 51 and 52. The light-scattering means prevents the silhouette of the fluorescent lamps 50 from being reflected on a display surface of an LCD panel. Thereby providing a backlight unit with uniform luminance. Also, a reflective sheet 53 is provided below the fluorescent lamps 50 and the first and second point light sources 51 and 52, to concentrate the light emitted from the fluorescent lamps 50 toward the display part of the LCD panel.

Second Embodiment

A backlight unit, according to the second embodiment of the present invention will be described as follows.

Figure 6:
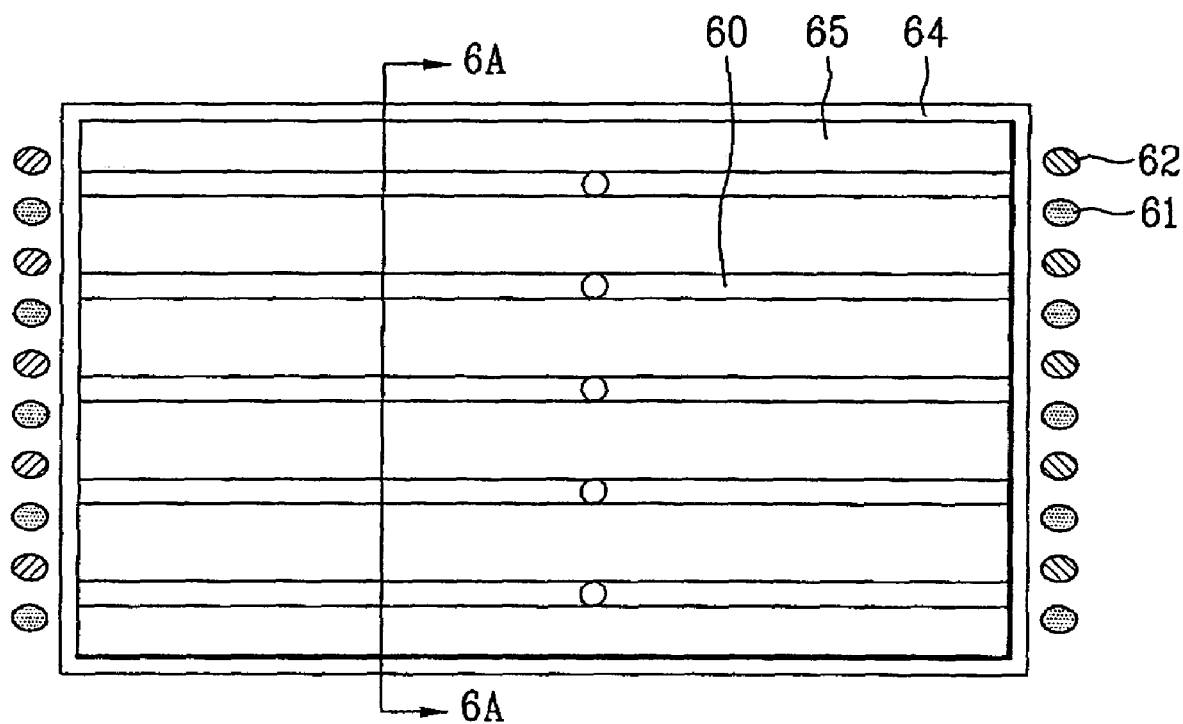
FIG. 6 is a plane view of a backlight unit, according to a second embodiment of the present invention.

FIG. 6 is a plane view of a backlight unit, according to the second embodiment of the present invention. As shown in FIG. 6, the backlight unit, according to the second embodiment of the present invention, includes a plurality of fluorescent lamps 60 under an LCD panel (not shown), a plurality of first pairs of first and second point light sources 61 and 62 at one side of the LCD panel, and a plurality of second pairs of first and second point light sources 61 and 62 at other side of the LCD panel. The plurality of fluorescent lamps 60 are disposed at fixed intervals to form a direct type backlight unit. The plurality of first and second pairs of first and second light sources 61 and 62 are provided at both ends of the fluorescent lamps 60, wherein each pair of first and second light sources 61 and 62 is provided between the adjacent fluorescent lamps 50.

Each fluorescent lamp 60 may be a CCFL (Cold Cathode Fluorescent Lamp) of white light having R, G and B wavelengths, a HCFL (Hot Cathode Fluorescent Lamp), or an EEFL (External Electrode Fluorescent Lamp). The first and second point light sources 61 and 62 may be LEDs of yellow and cyan colors.

Figure 6A:
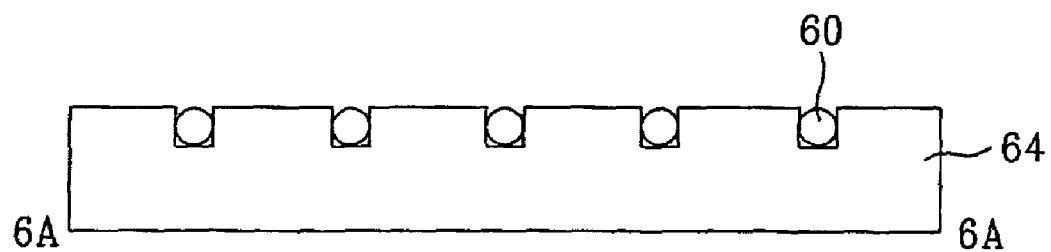
FIG. 6A is a cross section taken along line 6A-6A in FIG. 6.

In the backlight unit according to the second embodiment of the present invention, each pair of first and second point light sources 61 and 62 is provided along an end of the respective fluorescent lamps 60, such that the pairs form columns perpendicular to the fluorescent lamps 60. Furthermore, a light-guiding plate 64 is provided below the fluorescent lamps 60, whereby the light from the first and second point light sources 61 and 62 is guided by the light-guiding plate 64. AS shown in FIG. 6A, the light-guiding plate 64 has concave and convex portions and causes the first and second point light sources to function as an edge type backlight unit. The fluorescent lamps 60 are placed in the concave-shaped portions of the light-guiding plate 64 and function as a direct type backlight unit.

Although not shown, a light-scattering means, including a diffusion plate and a prism sheet, covers the fluorescent lamps 60, wherein the light-scattering means prevents the silhouette of the fluorescent lamps 60 from being visible on a display surface of an LCD panel, thereby providing a backlight unit with uniform luminance. A reflective sheet 65 can also be provided below the fluorescent lamps 60 and the first and second point light sources 61 and 62, to concentrate the light emitted from the fluorescent lamps 60 and the first and second point light sources 73 and 74 to the display part of the LCD panel.

In the backlight unit according to the second embodiment of the present invention, the fluorescent lamps 60 are disposed in the direct type, and the plurality of first and second pairs of first and second point light sources 61 and 62 are disposed in the edge type.

Third Embodiment

A backlight unit, according to the third embodiment of the present invention, will be described as follows.

Figure 7:
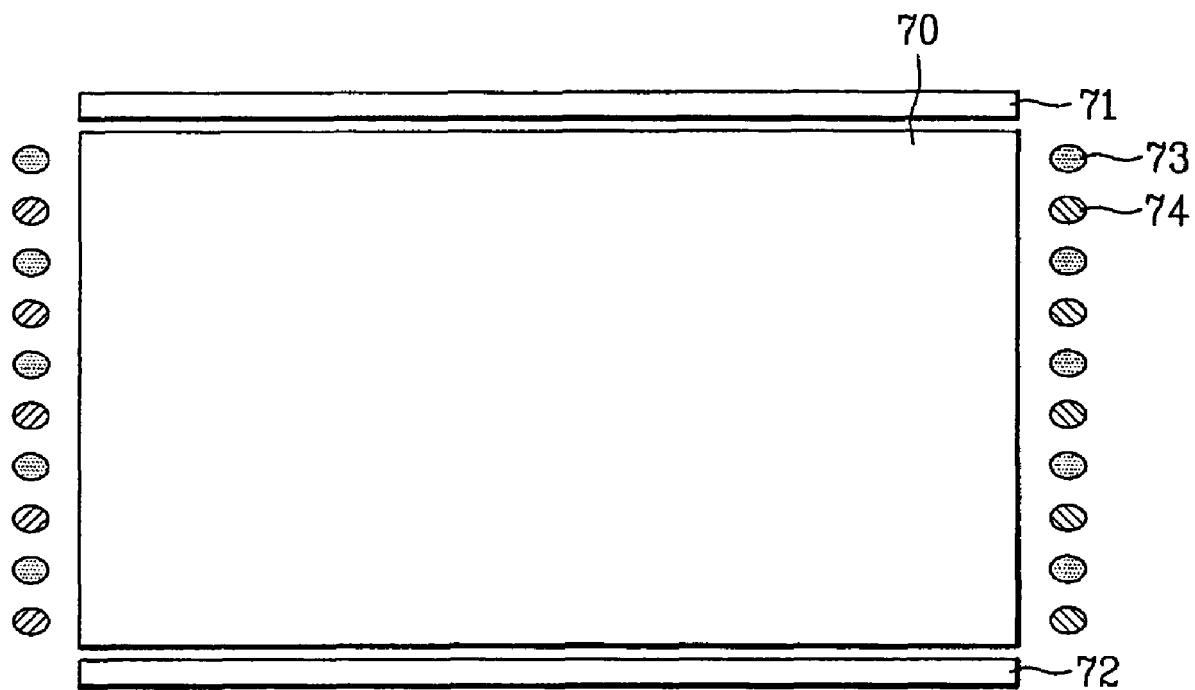
FIG. 7 is a plane view of a backlight unit, according to the third embodiment of the present invention.

FIG. 7 is a plane view of a backlight unit, according to the third embodiment of the present invention. As shown in FIG. 7, the backlight unit, according to the third embodiment of the present invention, includes a rectangular light-guiding plate 70, first and second fluorescent lamps 71 and 72, and a plurality of first and second point light sources 73 and 74. The first and second fluorescent lamps 71 and 72 are provided at first and second opposite sides of the light-guiding plate 70. The plurality of first and second point light sources 73 and 74 are alternately provided in first and second columns located along third and fourth sides of the light-guiding plate 70.

Each fluorescent lamps 71 and 72 may be a CCFL (Cold Cathode Fluorescent Lamp) of white light having R, G and B wavelengths, a HCFL (Hot Cathode Fluorescent Lamp), or an EEFL (External Electrode Fluorescent Lamp). The first and second point light sources 73 and 74 may be LEDs of yellow and cyan colors.

Although not shown, a light-scattering means, including a diffusion plate and a prism sheet, covers the light-guiding plate 70, thereby providing a backlight unit with uniform luminance. A reflective sheet (not shown) can also be provided below the fluorescent lamps 71 and 71 and the first and second point light sources 73 and 74, to concentrate the light emitted from the fluorescent lamps 71 and 72 and the first and second point light sources 73 and 74 to the display part of the LCD panel.

In the backlight unit according to the third embodiment of the present invention, the first and second fluorescent lamps 71 and 72 and the first and second point light sources 73 and 74 function as in an edge type backlight.

Fourth Embodiment

A backlight unit, according to the fourth embodiment of the present invention, will be described as follows.

Figure 8:
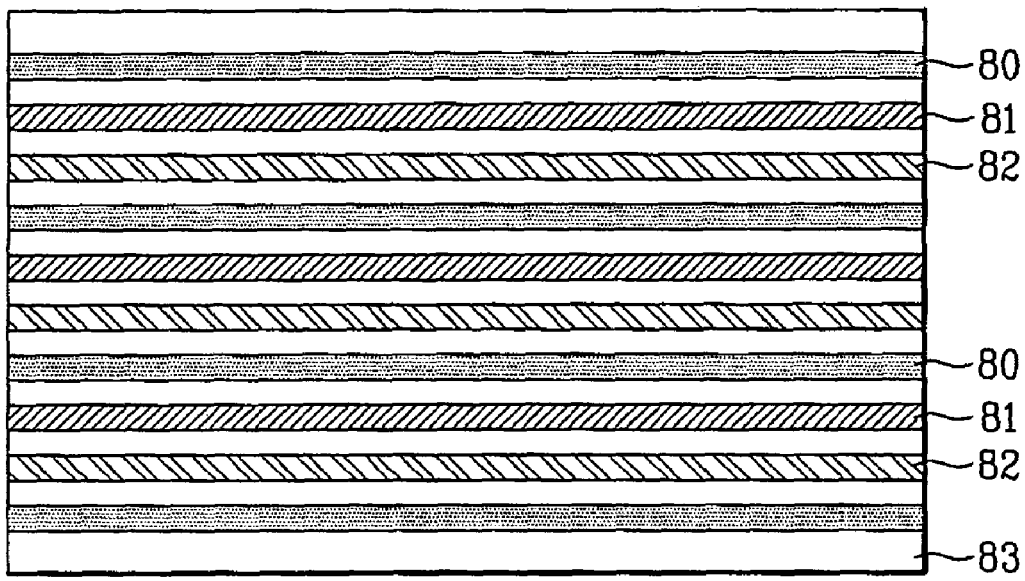
FIG. 8 is a plane view of a backlight unit, according to a fourth embodiment of the present invention.

FIG. 8 is a plane view of a backlight unit, according to the fourth embodiment of the present invention. As shown in FIG. 8, the backlight unit, according to the fourth embodiment of the present invention, includes a plurality of groups of first, second and third fluorescent lamps 80, 81 and 82, wherein the plurality of first, second and third fluorescent lamps 80, 81 and 82 are provided under an LCD panel at fixed intervals to form a direct type backlight.

Each of the first, second and third fluorescent lamps 80, 81 and 82 may be a CCFL (Cold Cathode Fluorescent Lamp), a HCFL (Hot Cathode Fluorescent Lamp), or an EEFL (External Electrode Fluorescent Lamp).

The first fluorescent lamp 80 is a fluorescent lamp of white color, having R, G, and B wavelengths. The second and third fluorescent lamps 81 and 82 are fluorescent lamps respectively coated with yellow and cyan pigments.

Although not shown, a light-scattering means, including a diffusion plate and a prism sheet, covers the first, second and third fluorescent lamps 80, 81 and 82, to prevent the silhouette of the first, second and third fluorescent lamps 80, 81 and 82 from being visible on a display surface of an LCD panel, thereby providing a backlight unit with uniform luminance. A reflective sheet 83 can also be provided below the first, second and third fluorescent lamps 80, 81 and 82, to concentrate the light emitted from the fluorescent lamps 80, 81 and 82 to the display part of the LCD panel.

In the backlight unit, according to the fourth embodiment of the present invention, the first, second and third fluorescent lamps 80, 81 and 82 function as a direct type backlight.

Fifth Embodiment

A backlight unit, according to the fifth embodiment of the present invention, will be described as follows.

Figure 9:
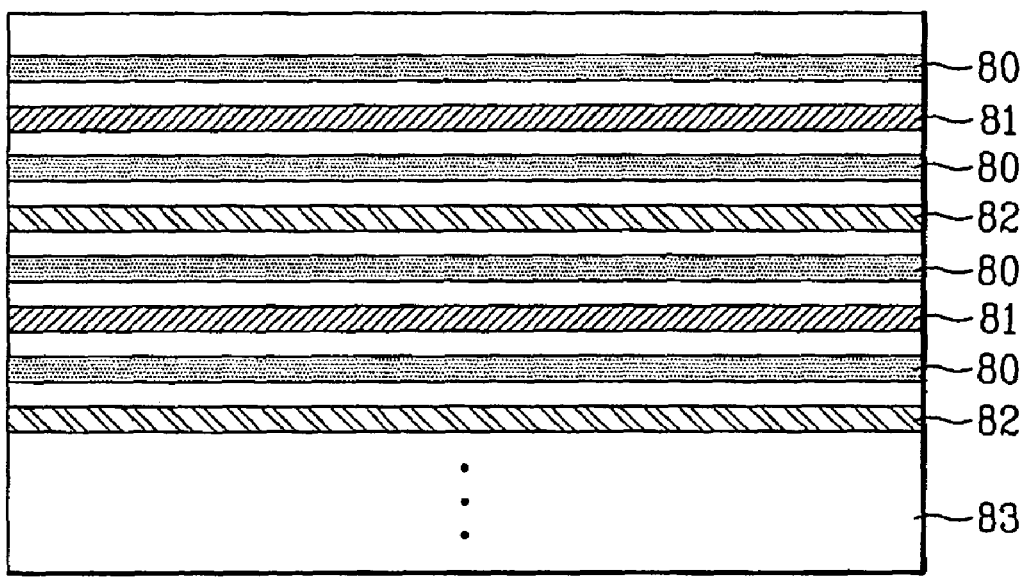
FIG. 9 is a plane view of a backlight unit, according to a fifth embodiment of the present invention.

FIG. 9 is a plane view of a backlight unit, according to the fifth embodiment of the present invention. As shown in FIG. 9, the backlight unit, according to the fifth embodiment of the present invention, includes a plurality of first, second and third fluorescent lamps 80, 81 and 82 under an LCD panel to form a direct type backlight. The plurality of first fluorescent lamps 80 are disposed at fixed intervals, and the second and third fluorescent lamps 81 and 82 are alternately disposed between adjacent first fluorescent lamps 80.

That is, the fluorescent lamps are disposed in order of the first fluorescent lamp 80/the second fluorescent lamp 81/the first fluorescent lamp 80/the third fluorescent lamp 82, whereby the first fluorescent lamp 80 makes a pair with the second fluorescent lamp 81 or the third fluorescent lamp 82.

Each of the second and third fluorescent lamps 80, 81 and 82 may be a CCFL (Cold Cathode Fluorescent Lamp), a HCFL (Hot Cathode Fluorescent Lamp), or an EEFL (External Electrode Fluorescent Lamp).

The first fluorescent lamp 80 is a fluorescent lamp of white color, having R, G, and B wavelengths. The second and third fluorescent lamps 81 and 82 are fluorescent lamps respectively coated with yellow and cyan pigments.

Although not shown, a light-scattering means, including a diffusion plate and a prism sheet, covers the first, second and third fluorescent lamps 80, 81 and 82, to prevent the silhouette of the fluorescent lamps 80, 81 and 82 from being visible on a display surface of an LCD panel, thereby providing a backlight unit with uniform luminance. A reflective sheet can also be provided below the first, second and third fluorescent lamps 80, 81 and 82, to concentrate the light emitted from the fluorescent lamps 80, 81 and 82 to the display part of the LCD panel.

In the backlight unit, according to the fifth embodiment of the present invention, the first, second and third fluorescent lamps 80, 81 and 82 function as a direct type backlight.

Figure 10:
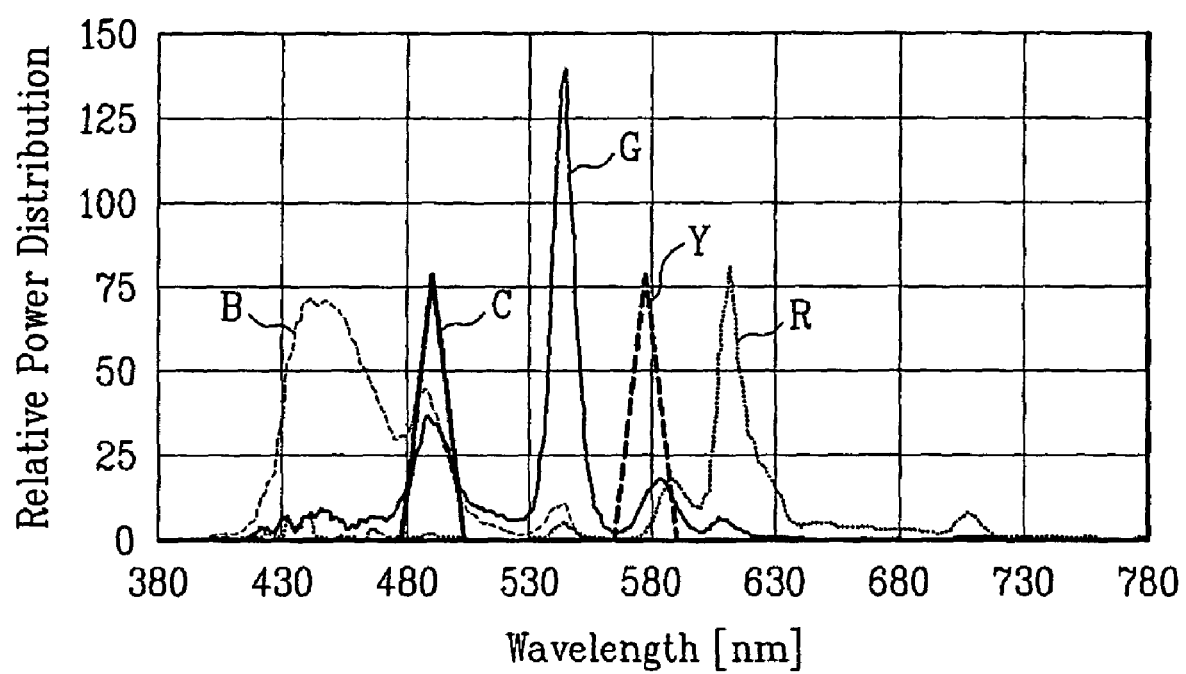
FIG. 10 is a graph of a spectrum of an LCD device using five primary colors according to the present invention.

FIG. 10 illustrates the spectrum of the backlight unit according to the first to fifth embodiments of the present invention. FIG. 10 illustrates a relative power distribution according to the wavelength. FIG. 10, shows the wavelengths of the five primary colors in order of the length of the wavelength, i.e. red (R), yellow (Y), green (G), cyan (C), and blue (B) in sequence. Red (R) has the longest wavelength, and blue (B) has the shortest wavelength. In addition to the fluorescent lamps of white color having R, G, and B wavelengths, light sources of yellow (Y) and cyan (C) are provided, thereby realizing five primary colors of five wavelengths.

LCD device according to the present invention will be described as follows.

Although not shown, the LCD device realizing five primary colors includes an LCD panel having upper and lower substrates and a liquid crystal layer formed between the upper and lower substrates. A backlight unit is provided at a lower side of the LCD panel. The lower substrate of the LCD panel is a thin film transistor array substrate, and the upper substrate of the LCD panel is a color filter array substrate. As shown in FIG. 4, on the upper substrate of the LCD device, according to the present invention, a color filter layer 40 is provided to form one unit pixel having first to fourth sub-pixels (R, G, B, W). It should be noted that it is possible to form the color filter layer 40 with the relative locations of the colors changed, such as having a changed position of blue (B) and white (W). The LCD device may have any one of the backlight units according to the first to fifth embodiments of the present invention.

A method of driving the LCD device having the backlight unit according to the preferred embodiment of the present invention will be described as follows. The method of driving the LCD device is categorized into a step of driving the pixel and a step of driving the backlight unit.

To realize the red (R) color, the first sub-pixel (R) is turned on, and all fluorescent lamps of white color in the backlight unit are turned on. At this time, the light sources of yellow (Y) and cyan (C) are turned off. In this state, the fluorescent lamps are corresponding to the fluorescent lamps 50 in case of the first embodiment of the present invention, are corresponding to the fluorescent lamps 60 in case of the second embodiment of the present invention, and are corresponding to the first and second fluorescent lamps 71 and 72 in case of the third embodiment of the present invention. Also, the light sources of yellow (Y) and cyan (C) are corresponding to the first and second point light sources 51 and 52 in case of the first embodiment of the present invention, are corresponding to the first and second point light sources 61 and 62 in case of the second embodiment of the present invention, and are corresponding to the first and second point light sources 73 and 74 in case of the third embodiment of the present invention.

To realize the green (G) or blue (B) color, the second or third sub-pixel (G or B) is turned on, and all fluorescent lamps of white color in the backlight unit are turned on. At this time, the light sources of yellow (Y) and cyan (C) are turned off. In this state, the fluorescent lamps are corresponding to the fluorescent lamps 50 in case of the first embodiment of the present invention, are corresponding to the fluorescent lamps 60 in case of the second embodiment of the present invention, and are corresponding to the first and second fluorescent lamps 71 and 72 in case of the third embodiment of the present invention. Also, the light sources of yellow (Y) and cyan (C) are corresponding to the first and second point light sources 51 and 52 in case of the first embodiment of the present invention, are corresponding to the first and second point light sources 61 and 62 in case of the second embodiment of the present invention, and are corresponding to the first and second point light sources 73 and 74 in case of the third embodiment of the present invention.

To realize the yellow (Y) color, the first, second and fourth sub-pixels (R, G, W) are turned on, and all fluorescent lamps of white color in the backlight unit are turned on. Also, the light source of yellow (Y) is turned on in state of a time division.

To realize the cyan (C) color, the second, third and fourth sub-pixels (G, B, W) are turned on, and all fluorescent lamps of white color in the backlight unit are turned on. Also, the light source of cyan (C) is turned on in state of a time division.

This driving method uses the four sub-pixels, and the backlight unit according to the first to third embodiments of the present invention, wherein the fluorescent lamps of white color are turned on in order to realize the R, G, or B color, and the corresponding first, second, or third sub-pixel (R, G, B) is turned on.

To realize the yellow (Y) color, the fluorescent lamps of white color and the corresponding light source are turned on, and the first, second and fourth sub-pixels (R, G, W) are turned on. Also, in order to realize the cyan (C) color, the fluorescent lamps of white color and the corresponding light source are turned on, and the second, third and fourth sub-pixels (G, B, W) are turned on.

A method of driving the LCD device using the backlight unit according to the fourth and fifth embodiments of the present invention will be described as follows.

In the method of driving the LCD device using the backlight unit according to the fourth and fifth embodiments of the present invention, the fluorescent lamps are sequentially driven by synchronizing the driving of the backlight unit with the response of the liquid crystal, according to video signals.

For example, when driving the backlight unit, the fluorescent lamp of white color, the light source of yellow (Y), and the light source of cyan (C) are turned on in sequence. In order to realize the yellow (Y) color, the first and second sub-pixels (R, G) are turned on when the fluorescent lamps of white color are turned on, the fourth sub-pixel (W) is turned on when the light source of yellow (Y) is turned on, and the fourth sub-pixel (W) is turned off when the light source of cyan (C) is turned on.

When driving the backlight unit, the fluorescent lamp of white color, the light source of yellow (Y), and the light source of cyan (C) are turned on in sequence. In order to realize the cyan (C) color, the second and third sub-pixels (G, B) are turned on when the fluorescent lamps of white color are turned on, the fourth sub-pixel (W) is turned off when the light source of yellow (Y) is turned on, and the fourth sub-pixel (W) is turned on when the light source of cyan (C) is turned on.

In the backlight units according to the fourth and fifth embodiments of the present invention, the fluorescent lamps of white color are corresponding to the first fluorescent lamps 80, the light sources of yellow are corresponding to the second fluorescent lamps 81, and the light sources of cyan are corresponding to the third fluorescent lamps 82.

In addition, the backlight units according to the fourth and fifth embodiments of the present invention may be driven in the following methods.

To realize the yellow (Y) color, in state of turning on all fluorescent lamps of white color, the fourth sub-pixel (W) is turned on after turning on the first and second sub-pixels (R, G). Thus, the yellow (Y) color is realized by combination of the first and second sub-pixels (R, G), and is outputted by turning on the fourth sub-pixel (W).

To realize the cyan (C) color, in state of turning on all fluorescent lamps of white color, the fourth sub-pixel (W) is turned on after turning on the second and third sub-pixels (G, B). Thus, the cyan color is realized by combination of the second and third sub pixels (G, B), and is outputted by turning on the fourth sub-pixel (W).

The backlight unit according to the present invention, the LCD device using the backlight unit, and the method of driving the same has the following advantages.

First, it is possible to realize five primary colors by adding the desired colors (yellow and cyan) while using the related art fluorescent lamps of white color having R, G, and B wavelengths, thereby removing the expense of developing a new backlight unit.

Also, the five primary colors are realized with four sub-pixels (R, G, B, W), instead of five sub-pixels. Thereby it is possible to have a greater aperture ratio with four sub-pixels as compared to five sub-pixels. That is, the LCD device using four sub-pixels according to the present invention has higher aperture ratio than that of the related art LCD device using five sub-pixels.

In addition, a white sub-pixel (W) is used instead of a yellow (Y) or cyan© sub-pixel, thereby the image can be brighter, so as to realize a greater peak luminance.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A combination direct type and edge type backlight unit comprising:

a casing;

a direct type arrangement comprising a plurality of elongated fluorescent lamps fixed to said casing and forming a plurality of intervals therebetween, each of the fluorescent lamps having a first electrode end at one end of the lamp and a second electrode end at another end of the lamp; and a side type arrangement comprising a plurality of first and second point light sources, being disposed adjacent to one side of said plurality of fluorescent lamps and adjacent to an opposite side of said plurality of fluorescent lamps, wherein all of the plurality of first light sources are provided along a first column that is perpendicular to the longitudinal axis of the fluorescent lamps, and all of the plurality of second light sources are provided along a second column that is perpendicular to the longitudinal axis of the fluorescent lamps, wherein the first and second columns are arranged at opposite sides of the casing respectively and the columns are located adjacent to the electrode ends of the fluorescent lamps, and wherein said first and second light sources are alternately placed in said first column and alternately placed in said second column.

2. The backlight unit of claim 1, wherein said plurality of fluorescent lamps are parallel to each other.

3. The backlight unit of claim 1, further comprising:
a light-guiding plate extending between said one side of said casing and said opposite side of said casing.

4. The backlight unit of claim 3, wherein said light guiding plate includes concave portions and convex portions.

5. The backlight unit of claim 4, wherein the fluorescent lamps reside adjacent said concave portions of said light guiding plate.

6. The backlight unit of claim 1, further comprising a light-scattering means at least partially covering said plurality of fluorescent lamps and said plurality of first and second light sources.

7. The backlight unit of claim 1, wherein said plurality of elongated fluorescent lamps include lamps having white color having R, G, and B wavelengths.

8. The backlight unit of claim 1, wherein said plurality of first and second light sources include LEDs having yellow and cyan colors, respectively.

9. The backlight unit of claim 1, wherein said plurality of fluorescent lamps include at least one of CCFLs (Cold Cathode Fluorescent Lamps), HCFLs (Hot Cathode Fluorescent Lamps), and EEFLs (External Electrode Fluorescent Lamps).

10. The backlight unit of claim 1, wherein a pair of the first and second light sources are provided between imaginary lines along length directions of adjacent two fluorescent lamps.

11. The backlight unit of claim 3, wherein the plurality of first and second light sources are provided outside the light-guiding plate.

* * * * *